United States Patent [19]

Willis et al.

[11] 4,396,761

[45] * Aug. 2, 1983

[54] METHOD FOR REMOVING HYDROGENATION CATALYST RESIDUES FROM HYDROGENATED CONJUGATED DIENE POLYMERS

[75] Inventors: Carl L. Willis; Lynn H. Slaugh, both of Houston, Tex.

[73] Assignee: Shell Oil Company, Houston, Tex.

[ * ] Notice: The portion of the term of this patent subsequent to Feb. 16, 1999, has been disclaimed.

[21] Appl. No.: 294,969

[22] Filed: Aug. 21, 1981

[51] Int. Cl.³ .............................................. C08F 6/08
[52] U.S. Cl. .................................. 528/487; 528/498; 528/501; 528/503
[58] Field of Search ........................................ 528/487

[56] References Cited

U.S. PATENT DOCUMENTS 4,316,008  2/1982  Willis .................................. 528/487

Primary Examiner—C. A. Henderson

[57] ABSTRACT

A process is disclosed for removing hydrogenation catalyst residues from hydrogenated conjugated diene polymers by contacting a hydrocarbon solution of said polymers with an aqueous dilute solution of an alpha-hydroxysulfonic acid, separating the aqueous phase from the hydrocarbon phase, removing the hydrocarbon solvent from the hydrocarbon phase, producing a solid polymer, and applying heat and/or vacuum to the solid polymer to remove the residual alpha-hydroxysulfonic acid.

7 Claims, No Drawings

METHOD FOR REMOVING HYDROGENATION CATALYST RESIDUES FROM HYDROGENATED CONJUGATED DIENE POLYMERS

FIELD OF THE INVENTION

This invention provides for a method for removing the residues of hydrogenation catalysts from hydrogenated conjugated diene polymers by contacting the residue-containing polymers with an aqueous solution of an alpha-hydroxysulfonic acid.

BACKGROUND OF THE INVENTION

The hydrogenation of unsaturated polymers is well known in the prior art. Usually a solution of polymer in an inert solvent is contacted at elevated temperature with hydrogen under pressure in the presence of a heavy metal catalyst, which is often a transition metal catalyst such as nickel, cobalt, iron, platinum and the like. Nickel is a particularly useful and efficient hydrogenation catalyst, especially in the form of nickel compounds activated by special reduction methods.

Unsaturated polymers are hydrogenated or otherwise treated for a variety of reasons, frequently using a nickel catalyst. The presence of olefinic double bonds in the polymers makes them susceptible to oxygen attack and to deterioration by actinic radiation; saturation of olefinic double bonds greatly improves environmental stability. Hydrogenation may improve color. Polyethylene has been produced by hydrogenation of elastomeric polybutadiene (Ind. and Eng. Chem. 45, 1117–22 (1953), and Rubber Chem. and Tech. 35, 1052 (1962)). In certain block co-polymers or homopolymers resistance to flow under stress when hot is improved by hydrogenating the aromatic rings to alicyclic rings.

A common problem shared by all of these types of hydrogenated polymers is the deleterious effect of catalyst residues remaining after hydrogenation. The quantity of metal residues to be removed may be as high a 5% w although substantially smaller amounts usually are present. Nickel, for example, discolors the product and may cause polymer deterioration by promoting reactions with air and actinic radiation; it must therefore be removed almost completely. Filtration may be carried out first to remove much of the catalyst residue but residual contamination is very difficult to remove by purely physical separation; chemical reaction and separation are required. Furthermore, especially with highly viscous polymer solutions filtration often is an impractical means of removing even gross amounts of catalyst residue.

One typical method utilized in the art to remove catalyst residue is the utilization of a dilute solution of sulfuric acid. In this process the dilute sulfuric acid is contacted with the polymer which has been dissolved in a suitable solvent. After contact the polymer-containing phase is separated from the aqueous phase and then the polymer-containing phase is contacted with live steam. The live steam drives off the polymer solvent and converts the polymer into polymer crumb. The main drawback to this process is that a residual amount of sulfuric acid because of its high boiling point, will remain on the polymer crumb and will constitute an impurity that can have a deleterious effect on the finished polymer. For example, the residual sulfuric acid can serve as a catalyst to degrade the polymer, sulfate residually unsaturated bonds, induce crosslinking reactions, etc. The instant process on the other hand provides a means whereby the amount of residual acid in the polymer crumb can be readily reduced by the application of heat and/or vacuum.

SUMMARY OF THE INVENTION

The present invention is a method for removing hydrogenation catalyst residues from hydrogenated conjugated diene polymers by contacting hydrocarbon solutions of such residue-contaminated polymers with an aqueous dilute solution of an alpha-hydroxysulfonic acid, separating the aqueous phase from the hydrocarbon phase, removing the hydrocarbon solvent from the hydrocarbon phase, producing a solid polymer phase, and subsequently applying heat and/or vacuum to the solid polymer to remove residual alpha-hydroxysulfonic acid. The present process provides a convenient method for substantially removing residual acid from the final polymer crumb product, and this process can be readily adapted to current commercial processes. The alpha-hydroxysulfonic acid is prepared by reacting a carbonyl compound with sulfur dioxide and water. By-product sulfonate salts produced by the reaction of the alpha-hydroxysulfonic acid with the catalyst residue can readily be converted back to the carbonyl compound by the application of heat and/or vacuum, with the carbonyl compound being readily recycled to produce additional alpha-hydroxysulfonic acid.

DESCRIPTION OF THE PREFERRED EMBODIMENTS

Among the unsaturated polymers that may be hydrogenated to products suitable for treatment by the method of this invention are homopolymers made from open chain conjugated dienes having from 4 to 8 carbon atoms per molecule, various types (e.g., block or random) of copolymers of these conjugated dienes with vinyl arenes, and homopolymers of vinyl arenes.

The homopolymers, random copolymers and block copolymers that can be made by these processes are well known to the art. Free radical polymerization of unsaturated hydrocarbon monomers is discussed at length in Whitby's book "Synthetic Rubber" and in hundreds of patents and scientific papers. Block copolymers are the subject of many patents and numerous scientific papers. References that describe polymerization techniques for block polymers are U.S. Pat. Nos. 3,231,635; 3,301,840; 3,465,063; and 3,281,383, et al. The term "vinyl arene" as used herein is intended to include styrene, ring substituted styrenes and species having alkyl substituents on the vinyl group in the alpha position such as alpha methyl styrene.

These unsaturated polymers may be hydrogenated partially, or selectively, or completely by techniques known to the art, using finely divided metals as catalysts and hydrogen under pressure and elevated temperature. The catalysts are typically transition metal catalysts. The catalyst may be, for example, nickel on kieselguhr, Raney nickel, finely divided cobalt, and the like. It will be understood that it is not important to this invention how the metal catalyst was made. With these catalysts hydrogenation may be partial or complete, in the sense that all or part of the double bonds in the unsaturated polymers are saturated.

A particularly useful type of metal catalyst is made by reducing a metal compound or chelate of cobalt or nickel, with an aluminum containing reducing agent. An example is a reaction product of nickel acetate or octoate with triethyl aluminum. Nickel and cobalt salts of alkanoic acids with from 1 to 12 carbon atoms in the alkanoate moiety are particularly suitable, as are nickel chelates, such as nickel acetylacetonate. Dicobalt octacarbonyl, cobalt acetate, cobalt hydroxide and cobalt salts of alkanoic acids all produce essentially the same results. Organometallic reducing agents may be aluminum compounds, especially hydrocarbyls such as aluminum triethyl, aluminum triisobutyl, aluminum triphenyl and the like. Lithium aluminum hydride, aluminum hydride and aluminum powder may also be used as reducing agents.

Suitable precursor polymers include linear and branched configurations having individual polymer blocks such as polybutadiene, polyisoprene, polystyrene or poly alpha-methylstyrene. Typical species include polystyrene-polyisoprene, polystyrene-polybutadiene-polystyrene and poly(alpha-methylstyrene)-polyisoprene-poly(alpha-methylstyrene).

Typical completely hydrogenated polymers containing metal catalysts that benefit from the method of this invention are hydrogenated polybutadiene, hydrogenated polyisoprene, completely hydrogenated polystyrene, completely hydrogenated random styrene-butadiene copolymers, completely hydrogenated vinyl arene-diene block copolymers, as for example described in U.S. Pat. Nos. 3,333,024 and 3,431,323, and completely hydrogenated all-diene block copolymers, as for example described in U.S. Pat. No. 3,465,063.

When hydrogenation is finished, the metal catalyst residue is insoluble in the water-immiscible inert solvent, usually a hydrocarbon, used for the hydrogenation. The hydrogenated polymer may be in solution, or it may be partially precipitated if the polymer structure is such that it partially crystallizes; for example, a hydrogenated polystyrene-polyisoprene-polystyrene is soluble in a cyclohexane hydrogenation solvent, but a hydrogenated cis-1,4 polybutadiene is a crystalline polyethylene that may be only partly soluble at room temperature. Aliphatic, cycloaliphatic and aromatic solvents may be used. Cyclohexane is a preferred solvent.

The alpha-hydroxysulfonic acids of the general formula $$\underset{R_1R_2CSO_3H}{\overset{OH}{|}}$$

used in the extraction process of the instant invention are prepared by reacting a carbonyl compound with sulfur dioxide and water according to the following general equation.

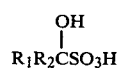
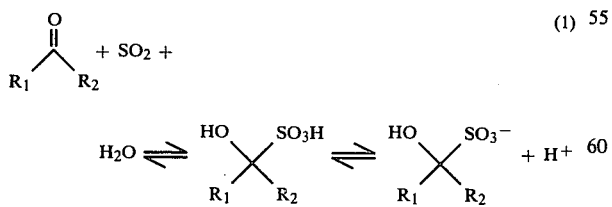

(1)

where $R_1$ and $R_2$ are individually hydrogen or hydrocarbyl with up to about 7 carbon atoms.

Illustrative examples of carbonyl compounds useful to prepare the alpha-hydroxysulfonic acids used in this invention are found where $R_1 = R_2 = H$ (formaldehyde)
$R_1 = H$, $R_2 = CH_3$ (acetaldehyde)
$R_1 = H$, $R_2 = CH(CH_3)_2$ (i-butyraldehyde)
$R_1 = H$, $R_2 =$

CCHCHCHO (furfural)

$R_1 = H$, $R_2 =$

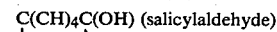

C(CH)$_4$C(OH) (salicylaldehyde)

$R_1 = H$, $R_2 =$

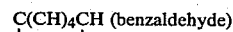

C(CH)$_4$CH (benzaldehyde)

$R_1 = R_2 = CH_3$ (acetone)
$R_1 = CH_3$, $R_2 = CH_2CH_3$ (methyl ethyl ketone)
$R_1 = CH_3$, $R_2 = CHC(CH_3)_2$ (mesityl oxide)
$R_1 = CH_3$, $R_2 = CH_2CH(CH_3)_2$ (methyl i-butyl ketone)
$R_1$, $R_2 = (CH_2)_5$ (cyclohexanone) or
$R_1 = CH_3$, $R_2 = CH_2Cl$ (chloroacetone)

A unique feature of these acids is the easy reversibility of the acid formation according to equation (1). That is, when heated sulfur dioxide is liberated and the solution becomes neutral. Decreasing the sulfur dioxide pressure for this system induces the same effect. This reversibility provides the method utilized to remove unneutralized acid from the purified polymer. By increasing the temperature or lowering the pressure, the sulfur dioxide can be driven off leaving the carbonyl compound in water. These latter materials can then be removed by conventional means, e.g., continued application of heat and/or vacuum, solvent washing, centrifugation, etc.

Metal ions are thought to chelate with the alpha-hydroxysulfonic acids according to the following formula.

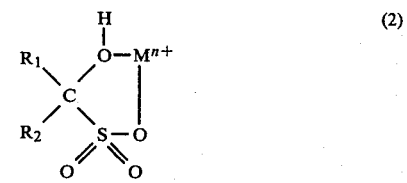

(2)

where $R_1$ and $R_2$ are as defined above and $M^{n+}$ is a metal ion for example, $Ni^{++}$, $Fe^{+++}$, $Co^{++}$, $Li^+$, $Al^{+++}$, etc. The spent aqueous extractant will contain the sulfonate of formula (2) and, if desired, the carbonyl compound can be recovered for recycle by the application of heat according to the following formula.

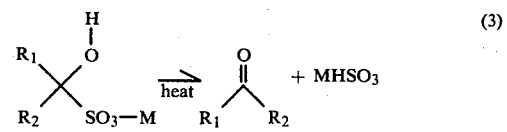

(3)

The alpha-hydroxysulfonic acids utilized in the instant invention are very strong acids, as strong as, if not stronger than HCl. For this reason these acids can be used to extract both ionic metal impurity catalyst residues from polymers as well as metals in a zero valent state. For the latter metals in the zero valent state contact with the alpha-hydroxysulfonic acids in the presence of air will convert them into ionic metals which are then chelated.

The process of the instant invention is basically a four step process for removing hydrogenation catalyst residues from hydrogenated conjugated diene polymers which comprises the following steps: (1) contacting a hydrocarbon phase which comprises the hydrogenated polymer, the catalyst residue and a hydrocarbon solvent with an aqueous solution of an alpha-hydroxysulfonic acid, (2) separating the aqueous phase from the hydrocarbon phase thereby producing a hydrocarbon phase having substantially removed therefrom said catalyst residues, (3) removing the hydrocarbon solvent from the hydrocarbon phase, producing a solid polymer phase, and (4) applying heat and/or vacuum to the solid polymer to remove residual alpha-hydroxysulfonic acid.

The amount of alpha-hydroxysulfonic acid used should be at least chemically equivalent to the moles of heavy metal contaminant present. The quantity of alpha-hydroxysulfonic acid will depend on the particular metal contaminant and the amount to be removed, and the stability of the complex that forms with the metal.

The acid-containing aqueous phase will contain acid in dilute amounts. The concentration of the alpha-hydroxysulfonic acid present will range from about 0.1 to about 10% by weight, preferably from about 0.5 to about 7% by weight, and more preferably from about 1 to about 5% by weight.

The contact and phase separation steps (1 and 2) of the method of this invention may be conducted at temperatures from about 0° C. to about 200° C. and at pressures ranging from about 0.1 of an atmosphere to about 20 atmospheres. Preferred temperatures are from about 0° C. to about 100° C. and preferred pressures are from about 0.5 of an atmosphere to about 5 atmospheres. The particular temperature and pressure to be optimally utilized will depend on the particular alpha-hydroxysulfonic acid chosen. For example, the higher molecular weight alpha-hydroxysulfonic acids will optimally utilize lower temperatures than the lower molecular weight acids. For example, alpha-hydroxymethanesulfonic acid begins to lose some of its efficiency above about 100° C. because of a temperature equilibrium shift above this temperature toward the component parts, whereas alpha-hydroxyethanesulfonic acid begins to lose some of its efficiency above about 60° C. Contact times will range from about 0.01 hour to about 10 hours in the contact steps and from about 0.01 to about 14 hours in the phase separation step, but preferred contact times are from about 0.25 hours to 5 hours in the contact step and about 0.2 to about 1 hour in the phase separation step, although other times are not to be ruled out in the process of the invention, longer times being uneconomical.

The contact of the aqueous phase with the hydrocarbon phase involves intimate mixing of two immiscible phases by techniques that are well known in the art.

Phase separation to remove the aqueous solution containing the contaminated metal ions may be done in any of several means known to the art. The multi-phase system may be placed in the settling tank, or it may be centrifuged or may be run through a tower containing coalescing fibrous materials with a layer separation tank at the bottom, or by other means.

The removal of the hydrocarbon solvent from the hydrocarbon phase (step 3 above) is done in a traditional manner, as for example, the application of heat to drive off the hydrocarbon solvent vapors. A preferred method is to utilize live steam to provide heat and sweep off the hydrocarbon vapors. Temperatures must be high enough to remove the hydrocarbon solvent and can readily be determined by routine experimentation.

The application of heat and/or vacuum to the polymer crumb to remove the residual alpha-hydroxysulfonic acid (step 4 above) can be applied as a continuation of step 3 or as a separate step. The temperatures and vacuums utilized will depend on the particular alpha-hydroxysulfonic acid being removed. In a preferable embodiment live steam is used to both separate polymer crumb from the hydrocarbon phase and to remove acid residue from the polymer crumb.

The relative phase volumes of hydrogenation product to aqueous solution of complexing acid may be from about 0.1 to about 10. Preferred ratios may be affected by the polymer being extracted and its concentration in the hydrocarbon phase, the amounts of contaminating metals to be removed, and economics. The following illustrative embodiments illustrate the manner in which the invention may be carried out. The examples are for the purpose of illustration and the invention is not to be regarded as limited to any of the specific compounds or polymers due to conditions recited.

ILLUSTRATIVE EMBODIMENTS

In a typical preparation of an alpha-hydroxysulfonic acid, in particular alpha-hydroxymethanesulfonic acid, about 30 grams of sulfur dioxide were condensed (dry ice/acetone bath) into a 200 cc Fisher-Porter pressure bottle. The reaction vessel was opened and slightly less than one equivalent of aqueous formaldehyde solution (37%w $H_2CO$) was added. The pressure bottle was sealed and the mixture warmed to room temperature. The mixture was stirred vigorously overnight and then vented ($SO_2$) to the atmosphere. Analysis of the resulting aqueous phase (potentiometric titration with NaOH/$H_2O$) typically found about 5 M alpha-hydroxymethanesulfonic acid and a trace of sulfur dioxide. The solution could be stored for up to about four weeks in the pressure bottle without loss in activity.

A two-block copolymer of polystyrene and polyisoprene dissolved in cyclohexane was hydrogenated using a catalyst prepared by reducing nickel octoate with triethyl aluminum. The resultant polymer is typically utilized as a viscosity index improver for lubrication oils and is known in the trade as SHELLVIS ® 50 polymer. This material is described in U.S. Pat. No. 4,036,910 issued July 19, 1977, incorporated by reference.

424 Grams of 15%w of SHELLVIS ® 50 polymer in cyclohexane was added to a 1 liter, glass reactor. 276 Grams of 1%w aqueous alpha-hydroxymethanesulfonic acid was added and the reactor was heated to 65° C. and stirred for 30 minutes. The reactor was cooled and after setting for 10 minutes the hydrocarbon phase was decanted from the aqueous phase. The SHELLVIS ® 50 polymer was analyzed for residual nickel content both before and after extraction and the results are shown in Table I below. The above process was repeated using 1%w aqueous sulfuric acid as a control. The results for this control are also shown in Table I below.

To illustrate the efficacy of heat and/or vacuum in removing residual sulfur from polymer, polymer solutions which had been contacted with 1%w solutions of alpha-hydroxysulfonic acid and sulfuric acid were steam stripped, subjected to vacuum at 100° C., and both steam stripped and subjected to vacuum at 100° C. These results are shown in Table I.

In a similar set of experiments, a three-block copolymer of polystyrene-polybutadiene-polystyrene dissolved in cyclohexane was hydrogenated using the nickel octoate/triethyl aluminum catalyst described above. The resultant thermoplastic elastomer is known in the trade as KRATON® G-1651 polymer. This material is described in U.S. Pat. Nos. 3,595,942, issued July 27, 1971 and Re. 27,145 issued June 22, 1991, incorporated by reference.

Using the procedure discussed above, 424 grams of 10%w KRATON® G-1651 polymer in cyclohexane was added to a 1 liter glass reactor. Extraction with 276 grams of the 1%w aqueous alpha-hydroxymethanesulfonic acid afforded the results in Table I. This process was repeated using 1%w aqueous sulfuric acid as a control. The results for this control are also shown in Table I below.

To illustrate the use of steam stripping to remove residual sulfur from polymer, about 20 grams of the KRATON® G-1651 in cyclohexane was contacted with about 0.3 grams of a 1% solution of the respective acids. Similarly adulterated samples of SHELLVIS® 50 polymer were prepared by treating 20 g of the 15% wt polymer solution in cyclohexane with 0.3 grams of the respective 1% wt acid solutions. The treated polymer solutions were then steam stripped and the results are shown in Table I.

What is claimed is:

1. A process for removing transition metal hydrogenation catalyst residues from hydrogenated conjugated diene polymers which comprises (1) contacting a hydrocarbon phase which comprises the hydrogenated polymer, the catalyst residue and a hydrocarbon solvent with an aqueous solution of an alpha-hydroxy-sulfonic acid of the general formula $R_1R_2COHSO_3H$ wherein $R_1$ and $R_2$ are individually hydrogen or hydrocarbyl of up to about 7 carbon atoms, (2) separating the aqueous phase from the hydrocarbon phase, (3) removing the hydrocarbon solvent from the hydrocarbon phase, producing a solid polymer phase and (4) applying heat and/or vacuum to the solid polymer to remove residual alpha-hydroxysulfonic acid.

2. The process of claim 1 wherein the concentration of the alpha-hydroxysulfonic acid in water ranges from about 0.1 to about 10 percent by weight.

3. The process of claim 2 wherein the acid ranges from about 0.5 to about 7 percent by weight.

4. The process of claim 1 wherein step 1 is carried out at a temperature of from about 0° C. to about 200° C. and at pressures ranging from about 0.1 to about 20 atmospheres.

5. The process of claim 1 wherein steam is utilized to accomplish the hydrocarbon removal of step 3 and the residual acid removal of step 4.

6. The process of claim 1 wherein the catalyst residue comprises a cobalt or nickel catalyst residue.

7. The process of claim 1 wherein the catalyst residue additionally comprises an aluminum residue.

* * * * *

TABLE I

| Polymer | Description | Extraction Conditions | | Ni Residue (PPM) | | S Residue in Polymers | | | |
|---------|-------------|------|------|--------|-------|-----|-----|-----|-----|
| | | Time | Temp. | Before Extraction | After Extraction | A* | B* | C* | D* |
| SHELLVIS® 50 | Control using 1 wt % Aqueous $H_2SO_4$ | 30 min. | 65° C. | ~200 | 20 | 815 | 873 | 227 | 224 |
| | 1 wt % Aqueous Formaldehyde-$SO_2$ Reagent | 30 min. | 65° C. | ~200 | 22 | 489 | 523 | 187 | 206 |
| G-1651 | Control using 1 wt % Aqueous $H_2SO_4$ | 30 min. | 65° C. | ~60 | 1.8 | — | — | — | 152 |
| | 1 wt % Aqueous Formaldehyde-$SO_2$ Reagent | 30 min. | 65° C. | ~60 | 1.6 | — | — | — | 111 |

A* Treated with acid and then steam stripped
B* Treated with acid and then vacuum dried overnight at 100° C.
C* Treated with acid, steam stripped and then vacuum dried overnight at 100° C.
D* Samples were adulterated with authentic acid ($H_2SO_4$ or formaldehyde - $SO_2$ reagent respectively) at a level which constituted ~500 ppm sulfur residue in the polymer solids. These samples were then treated as described in A*.